March 14, 1967  E. J. DIEBOLD  3,309,578
ENCAPSULATED HIGH VOLTAGE RECTIFIER STACK
Filed March 18, 1965  2 Sheets-Sheet 1
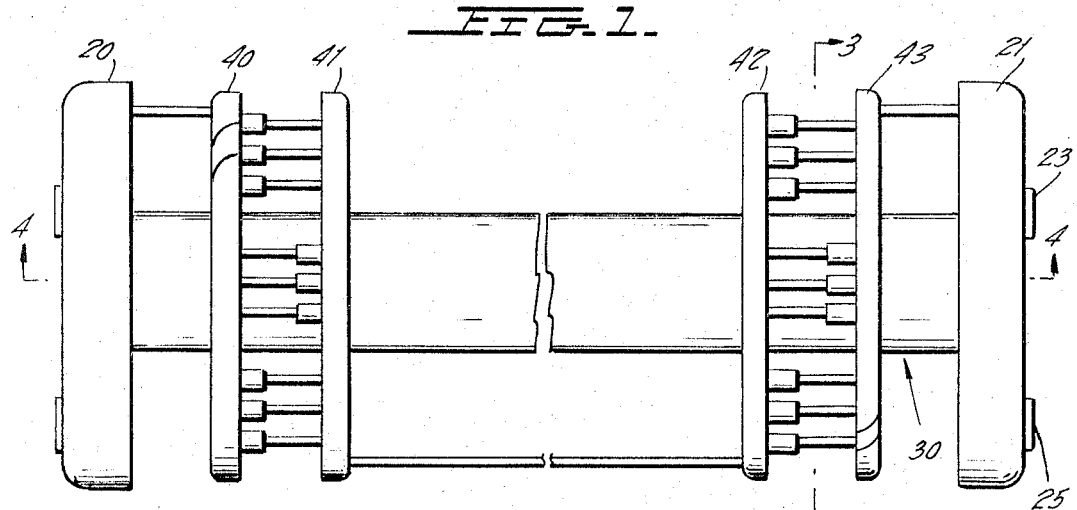
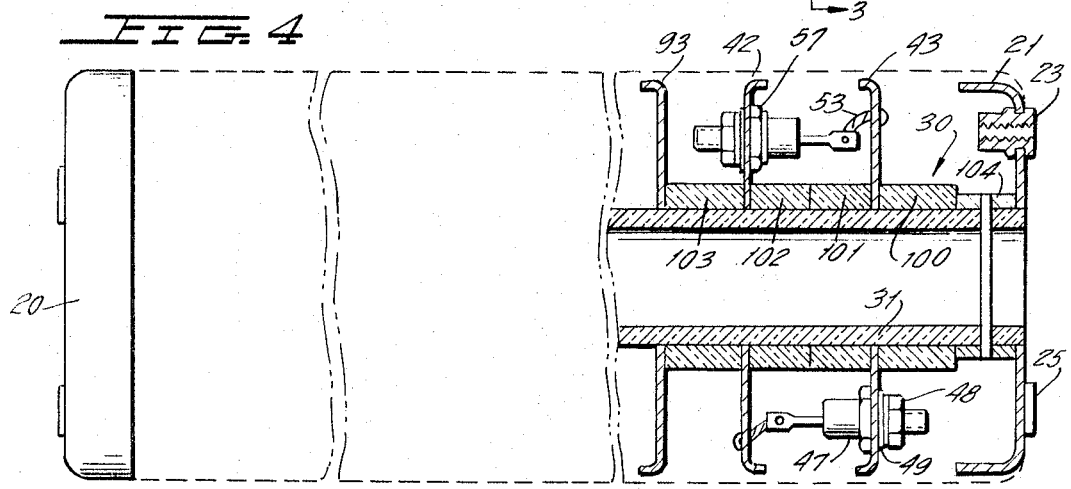
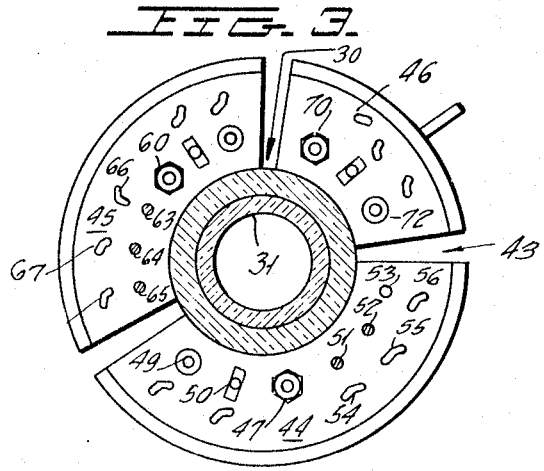
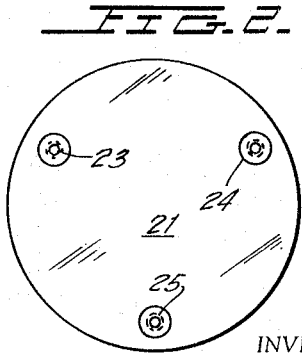
INVENTOR.
EDWARD J. DIEBOLD
BY
OSTROLENK, FABER, GERB & SOFFEN
ATTORNEYS

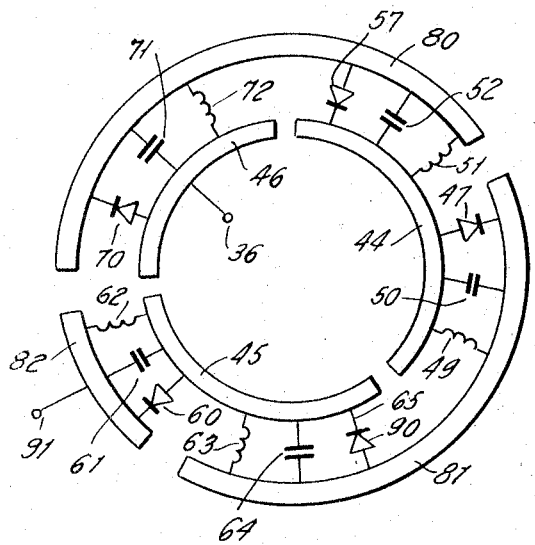

United States Patent Office 3,309,578
Patented Mar. 14, 1967

3,309,578
ENCAPSULATED HIGH VOLTAGE
RECTIFIER STACK
Edward J. Diebold, Palos Verdes Estates, Calif., assignor to International Rectifier Corporation, El Segundo, Calif., a corporation of California
Filed Mar. 18, 1965, Ser. No. 440,825
6 Claims. (Cl. 317—100)

This invention relates to high voltage rectifier stacks, and more specifically relates to a novel mechanical structure for high voltage rectifier stacks and a novel encapsulation treatment for the assembled stack.

High voltage rectifier stacks or columns which include a large number of series connected rectifier elements carried on a support body are well known. In addition, it is well known to encapsulate such assemblies and other similar assemblages of electrical equipment to protect the assembly against adverse electrical, mechanical and environmental conditions.

In accordance with the present invention, a novel mechanical assemblage is provided wherein the rectifier components, along with their respective voltage balancing equipment such as parallel connected resistors and capacitors, are connected directly between conductive support plates or fins which sequentially connect the rectifier elements in series in a novel manner.

In particular, each module layer is comprised of two opposing plates. Each of these plates are then comprised of a plurality of fins which are staggered in angular position with respect to the fins of the other plate forming the module. The electrical components such as the rectifiers, capacitors and resistors are then connected directly between these adjacent plates with the staggering of the fins forming the plates permitting a direct series connection of the various elements. Thereafter, a plurality of modules are assembled on a common central support shaft, and the entire assemblage is encapsulated in a novel manner wherein a first thin layer characterized in having superior electrical properties is first coated on the assemblage. Thereafter, a second and thicker layer is coated on the assemblage which is characterized in providing superior mechanical properties. Thereafter, a third and final encapsulation coating is applied to the assemblage which is characterized in having superior chemical properties in its resistance to the environment.

It is a pjrimary object of this invention to provide a novel high voltage rectifier column which substantially decreases component failure.

Another object of this invention is to provide a novel high voltage rectifier column structure which substantially decreases thermal failure of the components thereof.

Still another object of this invention is to provide a novel high voltage rectifier column which substantially decreases the possibility of mechanical failure within the device.

Another object of this invention is to provide a novel high voltage column of a large number of series connected elements which substantially eliminates failure of the device due to electrical arcs and corona.

A further object of this invention is to provide a novel encapsulated structure which has three encapsulation layers; an inner layer of material having superior electrical characteristics; a central layer of material having superior physical characteristics; and an outer layer of material having superior chemical characteristics.

Yet a further object of this invention is to provide a novel method for the encapsulation of electrical devices.

A still further object of this invention is to provide a novel method of encapsulating electrical devices wherein the complete electrical device is assembled independently of its encapsulating medium.

Another object of this invention is to provide a novel method for encapsulating an electrical device which substantially eliminates the existence of voids in the encapsulating medium.

Yet another object of this invention is to provide a novel method of encapsulating an electrical assemblage which prevents local overheating and uneven cooling.

A still further object of this invention is to provide a relatively inexpensive method for encapsulating electrical devices which, however, has superior encapsulation properties.

These and other objects of this invention will become apparent from the following description when taken in connection with the drawings, in which:

FIGURE 1 is a side plan view of a high voltage rectifier stack or column constructed in accordance with the present invention.

FIGURE 2 is an end view illustrating one of the end terminals of the stack of FIGURE 1.

FIGURE 3 is a partial cross-sectional view showing the interior of one of the support plates of FIGURE 1, and is taken across the line 3—3 in FIGURE 1.

FIGURE 4 is a partial cross-sectional view of FIGURE 1 taken across the line 4—4 in FIGURE 1.

FIGURE 5 schematically illustrates the electrical connection between a pair of adjacent plates defining one module in the device of FIGURES 1 through 4.

FIGURE 6 is a perspective view of a modified fin structure for one of the plates of one of the modules of FIGURES 1 through 4.

FIGURE 7 is a side cross-sectional view through a portion of a rectifier stack of an arrangement using fins of the type shown in FIGURE 6.

FIGURE 8 is an enlarged portion of FIGURE 7, and particularly illustrates the three layers of encapsulation material formed in accordance with the method of the present invention.

Referring now to the FIGURES 1 through 5, I have illustrated therein a high voltage rectifier stack which is terminated by two end terminals 20 and 21 which each have three threaded terminal elements such as the terminal elements 23, 24 and 25 for terminal 21, shown in FIGURES 1, 2 and 4.

The cross-sectional view of FIGURE 4 further includes therein a cross-sectional view of the connector 23 which is seen to be an internally threaded member having a generally circular outer surface which is passed through a suitable opening in terminal 21, and thereafter staked or otherwise suitably secured to the terminal 21. Thus, any of the terminal elements can threadably receive any suitable electrical terminal, as by threading or any other desired manner.

Each of terminal plates 20 and 21 are of any desired conductive material and can, for example, be of brass which is pressed to the dish-shape shown.

A main central support shaft 30 is then provided for the support of the complete assemblage, and is composed of a central circular phenolic tube 31 (FIGURES 3 and 4) which has mounted on the outer surface thereof suitable phenolic spacers which will be described more fully hereinafter.

Each of the individual modules forming the stack are then composed of opposing plates such as plates 40 and 41 and plates 42 and 43 (FIGURES 1 and 4) which have outer flanges or rims projecting toward one another and are each formed of a plurality of staggered fin sections.

More specifically, the plate 43 is shown in FIGURE 3 as being comprised of three fin sections 44, 45 and 46 which may each be, for example, of pressed brass.

Each of fins 44 and 45 then have suitable openings therein for the reception of leads or diode bodies. By way of example, fin 44 has a suitable opening therein for the reception of the extending stud of a standard diode 47 (FIGURES 3 and 4) which is bolted to the fin 44 as by a nut 48 and washer 49, as shown in FIGURE 4. In addition, the fin 44 has a pair of openings to the left of diode 44 for the reception of leads from a resistor 49 and capacitor 50 which are connected in parallel with diode 47, as will be seen more fully hereinafter.

There are three other sets of openings to the right of diode 47 in fin 44 of FIGURE 3 wherein three leads 51, 52 and 53 pass from the adjacent module 42, with the ends of the leads being turned back through the opposing openings and are shown as lead end portions 54, 55 and 56.

As will be seen more fully hereinafter, the lead 53 is the lead of diode 57 of FIGURE 4, while the leads 51 and 52 are the leads of its respective resistor and capacitor which are connected in parallel with diode 53 (shown in FIGURE 3 and eliminated from FIGURE 4 for purposes of clarity).

The construction of fin 45 of FIGURE 3 is identical to that of fin 44, and it has six component-receiving positions for receiving the diode 60 in bolted relation, and for receiving its parallel connected capacitor 61 and resistor 62.

In a similar manner, and below the diode 60, there are pairs of lead-receiving openings for receiving the leads 63, 64 and 65, and for-entrantly receiving their respective ends 66, 67 and 68 wherein the lead 65 is the upper lead of a diode extending from the module 42 in FIGURE 4.

Finally, the fin section 46 has three component receiving positions for receiving a diode 70 in bolted relation along with pairs of lead-receiving openings for the capacitor 71 and resistor 72 connected in parallel with diode 70.

The fins of the plates of adjacent modules are then staggered with respect to one another so as to define a continuous series connected progression of diodes.

To more clearly illustrate this concept, the arrangement of the fins is schematically illustrated in FIGURE 5. Thus, in FIGURE 5, the plate 43 is schematically illustrated as having conductive fin segments 44, 45 and 46, while the plate 42 which is adjacent plate 43, as shown in FIGURE 4, is schematically illustrated as externally surrounding the plate composed of fins 44, 45 and 46 with the plate 42 schematically illustrated as being composed of rotated fin sections 80, 81 and 82. Note that the actual construction of the schematically illustrated fins 80, 81 and 82 is identical to the actual construction of fins 44, 45 and 46, respectively.

FIGURE 3 illustrates the diodes 60, 70 and 47 which are bolted to fins 45, 46 and 44, respectively, wherein the anodes of these diodes are formed by their studs. The extending pigtail leads of the diodes bolted to plate 42 are further illustrated in FIGURE 5 as the leads 53 and 65 of the diodes 57 and 90 which are bolted to the staggered fins 80 and 81, respectively. The parallel connected capacitors and resistors of FIGURE 3 are further identified in FIGURE 5 by similar identifying numerals.

Thus, the series connected progression of diodes can be traced from the lead 36, schematically illustrated as a terminal in FIGURE 5 connected to the fin 46. The series connection of diodes then progresses from fin 46 to diode 70, fin 80, diode 57, fin 44, diode 47, fin 81, diode 90, fin 45, diode 60, and thence to a schematically illustrated terminal 91 which extends from fin 82, and will, for example, be electrically connected to the next plate such as plate 93 of FIGURE 4 of the next adjacent module of elements.

The module assembly, schematically illustrated in FIGURE 5 and shown in FIGURES 1, 3 and 4, will be observed to contain an odd number of diodes. Note that any desired number of odd numbers of diodes can be used for a module by increasing the number of fins in a suitable manner. The present invention has been illustrated in this connection with three fins and five diodes, but it will be understood that this is merely exemplary. Moreover, each diode can have additional diodes connected in parallel therewith to increase the current capacity of the assembly.

It will be further understood from a consideration of FIGURES 3, 4 and 5 that by "staggering" the fins of adjacent plates of modules, I mean that the fin locations are mechanically rotated in space with respect to one another, so that the single fin-receiving diode is rotated from the fin-receiving diode of the adjacent plate by an angle somewhat greater than the angle occupied by the single component-receiving fin element.

In making the stack, the individual modules are first subassembled with suitable interposed spacers such as spacers 101 and 102 in FIGURE 4, and their connections soldered together with the individual modules being electrically connected to one another after being placed on the assembly. Thereafter, insulation spacers such as spacers 100, 101, 102, 103 which carry the modules are slid over the tube 31, as illustrated, with the fins being interposed between adjacent spacing rings. Thereafter, the various spacers are rigidly secured to the central tube 31 as by cementing with a suitable epoxy, or by otherwise securing the spacers to the tube.

Note that an end spacer ring 104 which falls just short of the end of tube 31 permits sufficient room for the placement of the end terminals such as terminal 21 which is also secured to the tube by cementing with a suitable epoxy cement.

After the assembly is completed, the entire device is a completely operable, high voltage stack which is later subjected to an encapsulation operation which will be described more fully hereinafter.

In the foregoing figures, the individual fins have been shown as having openings therethrough for the reception of the various components. Clearly, however, the fins can be constructed as illustrated in FIGURE 6 for a fin 110 which is equivalent, for example, to fin 44, wherein the fin is provided with an internal diameter collar 111 and stamped projecting terminal-receiving elements 112 through 117 which have suitable lead conductor openings therein.

FIGURE 7 shows a cross-sectional view of a portion of a stack using fins of the type illustrated in FIGURE 6. Thus, in FIGURE 7, a pair of plates 118 and 119 oppose one another in the usual manner, and are formed of fin elements in the manner described in FIGURE 6. Thus, in FIGURE 7, the opposing fin sections 120 and 121 have their internal respective collars 122 and 123, respectively, similar to collar 111 of FIGURE 6 extending into the notch 124 of a spacer 125 which may be of impregnated wood or any other suitable inexpensive insulation body. Opposing spacer rings 126 and 127 which, along with spacer 125, are suitably cemented to the central insulation support tube 128, then rigidly position the module defined by the opposing plate members 118 and 119.

FIGURE 7 further illustrates the manner in which a flangeless diode 130 having extending terminals 131 and 132 is directly secured as by soldering to the openings in the stamped terminal sections 132a and 133 of fins 120 and 121, respectively. The adjacent module or lower module in FIGURE 7 is then provided with an upper plate 134 which is identical in construction to the plate 118.

In order to connect the adjacent modules to one another, FIGURE 7 illustrates the use of outwardly extending tabs such as tabs 135 and 136 of the fins of adjacent plates of adjacent modules wherein these tabs may be directly soldered or connected to one another by twisted wires, or the like.

Thereafter, and as illustrated in FIGURE 7, the complete assemblage is encapsulated with an encapsulation medium 137.

FIGURE 8 is an enlarged view of a portion of FIGURE 7 for purposes of better illustrating the novel encapsulation process of the invention. More specifically, three layers of encapsulation are used in accordance with the invention, wherein these three layers coat all of the exposed surfaces of the entire stack interior. Thus, in FIGURE 8, there is illustrated an interior layer 140, a central layer 141, and an outer layer 142 of encapsulation mediums which are intimately bonded to one another and to the exposed surfaces of the stack interior.

It is to be noted that the novel encapsulation method and structure to be described hereinafter applies particularly to the high voltage stack of the invention, but also has general application to the encapsulation of any electrical equipment.

The method of encapsulating the assembled device is as follows:

The complete assemblage is first mechanically and electrically completed and tested to insure that it meets required specifications, except for the requirement of additional protection against atmosphere. That is to say, the complete assemblage, in the absence of the encapsulation medium, has been electrically and mechanically completed as by securing or cementing the various elements together and insuring that the various components to be connected have been mechanically secured to their respective terminals and suitably soldered.

After this initial mechanical and electrical test, the complete stack is dried in an oven for at least 24 hours at some suitable drying temperature to eliminate all traces of moisture. Preferably, the various components used in the assemblage are initially individually oven-dried so that no excessive moisture will be present even at the beginning of the 24 hour drying cycle.

Thereafter, the oven-dried stack is vacuum impregnated with an extremely high grade varnish at elevated temperature. This varnish is extremely thin at this high temperature so that under the vacuum it will penetrate all portions of the stack, even the finest crevices, without leaving voids and without causing local build-up of large quantities of thick varnish. Thereafter, the thin varnish coating is oven-cured to obtain the very highest possible electrical insulation properties independently of any poor mechanical or chemical insulation properties that this selective treatment may cause.

The cycle of vacuum, impregnation and curing is then repeated one or more times until enough varnish impregnation is achieved to insure that all crevices are filled, and that the electrical properties of the varnish are as high as required.

Thereafter, the second encapsulation coating 141 of FIGURE 8 is applied to the stack as in one or more layers of tough, thick and resilient plastic as by using a dipping and spinning method, and thereafter suitably curing this relatively thick resilient plastic. Any suitable plastic having good mechanical properties independently of the quality of its electrical and chemical properties can be used in this step. However, since this coating is applied around a superior electrical insulation coating, its poor electrical properties will not cause any danger of electrical failure. Thus, the coating 141 is of a material selected for only mechanical protection, as against rough handling, shock and vibration.

Thereafter, a last coating 142 is applied to the device which is selected for superior chemical properties. By way of example, the coating 142 may be formed of which is applied to the device under vacuum and cured at a suitable curing temperature. The last layer 142 is particularly selected to provide protection against oxidation, corrosion, contamination, solvent, fungi and humidity. Thus, the coating is selected for utmost chemical protection independently of whatever poor mechanical and electrical qualities it may possess since the other layers provide the required mechanical and electrical strength.

When using the novel encapsulation method of the invention, it will be noted that the method completely eliminates the creation of voids. Moreover, since the various layers are selected for their optimum properties, no fillers are needed and no compromise is required in the selection of a single encapsulation medium.

Furthermore, each layer which is completely cured-through before the next layer is applied, in such a manner that the amount of insulating material between live parts of the stack and ambient is equal for all the parts in all the regions of the stack so that there are no thick bulky sections of encapsulation material and no thin spots in the encapsulation.

For this reason, the heat dissipation between the heated portions of the stack and ambient is equally good throughout the stack and not impaired by the need to conduct heat through a large bulk of material which has a low heat conductivity as in the case of devices which necessarily resort to a solid encapsulation arrangement.

The structure which is finally provided in accordance with the invention has a large number of advantages over the prior art types of devices. These advantages are described in the following sections divided into Mechanical Properties, Potential Control, Module Structure, Electrical Discharge and Heat Dissipation.

I. MECHANICAL PROPERTIES

The mechanical structure shown particularly in FIGURES 1 through 4 is a completly self-supporting structure by virtue of its central support tube 31 which reaches from one end to the other end of the structure. All of the components mounted on this central support tube are essentially ring-shaped and cannot accidentally fall off the tube. The central tube, while being structurally strong, however, is also resilient so that the system, when subjected to shock and vibration, can give without breaking.

The end terminals 20 and 21 of the assemblage shield the active components within the stack from external electrical fields by virtue of their ring shape. Moreover, these shields terminate the potentials of the rectifier stack.

The individual components of the device such as the various rectifiers, resistors and capacitors are then securely connected to the various tiers of plates which form the module walls of the tiers of plates being securely clamped to the central support tube 31. Note that they are secured to this tube prior to encapsulation and independently of the encapsulation medium so that the encapsulation does not have to provide the mechanical strength to hold the assemblage together.

The individual metallic fins forming the plates of the modules will each be understood to be simple and economical to manufacture, and can be strongly bonded prior to assembly to their respective spacers which ultimately fit around central tube 31. Therefore, under shock and vibration, the individual tiers or plates will not vibrate loose or fall off of the main central support, and are independent of the encapsulation medium for structural strength.

Moreover, each individual fin serves as an electrode for its respective diode or diodes so that each diode and its shunting resistor and capacitor is firmly connected between two fins. Note that there are no direct connections required between terminating wires, and that all wires are connected directly to solid fins having suitable wire-receiving openings or slots therein for firm attachment of the wires independent of any soldering operation. That is to say, the mechanical connection of the wire to the fin is made independent of any soldering operation being used solely to insure a good electrical contact. There are no solder joints made between loose wires, and no solder joints made for several wires in the same fin opening.

Furthermore, it will be observed that the various components between the fins are drawn straight between fins with short wire stubs directly hooked firmly into the slots or holes in the fins so that they can form a straight and solid connection without excessive stress, but also without being able to sag, warp, be pushed out of place or otherwise be located in such a way as to impair the performance of the rectifier assembly. Once again the soldering is accomplished after the mechanical mounting of the components, and is not used as a means of mechanical fastening.

The individual fins then further act as electrical shields and mechanical supports. Thus, together with the mounted components, they form a circular frame which has very high mechanical strength within the individual module. These extremely strong individual modules, which are sub-assembled, are then mounted on the central tube 31 together with the similar assemblies forming the entire rectifier column. Note that all of the individual modules may be completely pre-tested prior to their assemblage within the stack and encapsulation.

Moreover, and prior to encapsulation, it will be seen that all connecting solder joints are available for inspection and test prior to encapsulation.

II. POTENTIAL CONTROL

The assembled stack will be seen to have complete circular electrical symmetry so that the electrical potential around the rectifier column is essentially equal and gradually increasing in a helicoidal fashion from one end to the other. Accordingly, no high electrical gradients occur either around the periphery or along the length of the column. This keeps creepage and corona gradients low by virtue of the low potential rise from point-to-point. Moreover, flashover between the ends of the device is not possible because of the voltage dividing resistors and capacitors which divide the potentials of all of the fins or shields along each component on the entire assembly. The circular end shields 20 and 21 have a definite potential with regard to all the intermediary component parts and shields or fins.

Because of this construction, the entire structure is electrically homogeneous and there are no corners, zig-zag current paths or wire returns, thus substantially decreasing the possibility of flashover along such points of excessive electrical stress.

As pointed out previously each component of the assembly has very short leads so that current flow is through either short wires or through flat sheets of metal defining the fins. Therefore, the inductance of the conductors is substantially minimized, and is as low as the self-inductance between diodes and shunting capacitors. Furthermore, the mutual inductance between different diode groups in various modules is minimized and held to an equally distributed value so that the entire structure will behave in a predictable fashion.

Under voltage transients, the capacitance of various devices to ambient will also be equal and have a fixed definite value.

On the ends of the column, the capacitance from diode to ambient is held equal, as for those in the middle of the stack, by virtue of the end shields which prevent a deviation of this capacitance as would occur with an unshielded structure.

III. MODULE STRUCTURE

Each of the individual modules, as seen from the foregoing, consists of opposing plates which are each formed of fins wherein each fin carries at least one diode bolted thereto or otherwise suitably secured thereto as in FIGURE 7, along with the parallel connected capacitor and resistor which shunt the diode.

Each of these fins then act in the capacity of both an electrical conductor, a cooling fin and an electrostatic shield. The individual components connected to each fin are packed very closely to one another with short leads to minimize inductances. The opposite fin of the opposing plate of the module then similarly acts as a conductor, cooling fin and shield for the same three components. Note that the wire terminals of the various components are mechanically fastened and independently soldered between their respective fins so that each module consists of definitely located component parts precisely positioned with respect to each other and properly spaced for cooling, insulation and mechanical strength.

The value used for the capacitors is selected to suitably compensate the reverse recovery voltage of the diode and the variable capacitance effect of the various diodes during transient conditions. Similarly, the resistors are dimensioned to provide adequate damping for oscillations caused by the inductance and capacitance of the system.

After the subassembly of each of the individual modules, electrical connection to the adjacent module is made by connection to the terminal fins of the module. Thus, the individual module can be pre-tested for forward and reverse properties, even though permanently mounted in the assembly by gaining access to its terminal fins. In this test, the module may be subjected to the maximum voltage and current conditions which can be expected in normal operation.

After this test is performed, no additional mechanical or physical work is performed on the module except for the encapsulation thereof so that no disturbing influences are likely to deteriorate the successful electrical performance found for the module.

IV. ELECTRICAL DISCHARGES

The assembly has been seen to define low electric gradients between parts, either as surface gradients around the surface or flashover gradients between adjacent parts. These gradients are low enough so that the assembly can be tested in air prior to encapsulation without the danger of flashover. Note that the fins are preferably shaped to present no sharp corners to ambient with all parts being rigidly held in place so that they cannot accidently touch each other.

Once the stack is finished and tested to be found operable in air, it is then encapsulated as described in the preceding, initially with a high grade electrical insulation material so that creepage arcs, local corona and major corona to ambient are eliminated under even extreme voltages.

Because of the inherently low gradients, the charging of floating particles or dust precipitation is eliminated. Thus, the assembly is inherently immune to electrical discharge, and puncture of the insulation is eliminated by eliminating high applied potentials (even without encapsulation).

V. HEAT DISSIPATION

Heat generated in any of the components of the assemblage such as the diodes, resistors and capacitors, are very efficiently conducted through their short leads to the large terminating metallic fins. These short metallic lead wires will, of course, have a very low thermal resistance. Moreover, the major heat produced in the assembly will be in the diodes which are either directly bolted to the cooling fins to insure a minimum of thermal resistance, or are directly soldered to the fin over a short lead length as in the embodiment of FIGURE 7.

Heat is dissipated to the ambient by the cooling fins through the encapsulant which covers the entire fin surface in the several fin layers. Note that the encapsulant is relatively thin as compared to bulk encapsulation techniques formerly used in the prior art, so that heat flow is through the relatively small thickness of the protective coating, but over a very large area (the entire surface area on both sides of the fin, for example).

From the standpoint of heat conduction, this assures the lowest possible thermal resistance, since it provides a large flow area and a short distance. Thus, regardless of the thermal conductivity of the encapsulating material, this will result in a relatively low temperature drop between the cooling fin and the ambient air. It is to be understood that the insulating material has a very low conductivity as compared to metal, but even under this circumstance, the thermal drop through the layers has been found immeasurably small.

The heat dissipating area to ambient is made as large as possible, regardless of the orientation of the column. Thus, the column can be cooled with air flowing along its axis, or perpendicular to its axis, or in any other direction. The entire surface is used for cooling because the entire surface is provided with the heat conducted from the cooling fins.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A high voltage stack of series connected rectifier elements comprising a plurality of coaxial modules connected in series with one another; and a central insulation support shaft extending through the axis of each of said modules and mechanically connected to each of said modules; each of said modules comprising first and second generally parallel spaced plates; each of said first and second plates comprising a plurality of generally flat spaced and coplanar fin elements and a terminal fin element coplanar with and spaced from said generally flat fin elements; each of said plurality of flat fin elements including first and second connection means for mechanically and electrically receiving the anode and cathode terminal respectively of a first and second rectifier element of said plurality of rectifier elements; each of said terminal fin elements including connection means for mechanically and electrically receiving one of the cathode or anode terminals of one of said rectifier elements of said plurality of rectifier elements; each of said generally flat fin elements of said first and second plates being rotated out of registry with respect to one another with the first and second connection means of said plurality of fins of said first plate in registry with said second and first connection means respectively of said plurality of fins of said second plate; each of said connection means of said terminal fin elements of said first and second plates in registry with a first and second connection means respectively of one of said fins of said opposing first and second plates respectively; each of said rectifier elements electrically and mechanically connected between each of said registering first and second connection means of said fins of said first and second plates to define a progression of series connected rectifier elements.

2. The device substantially as set forth in claim 1 which further includes end terminal plates defining smooth electrode surfaces connected to the opposite ends of said high voltage stack.

3. The device substantially as set forth in claim 2 which further includes an insulation encapsulation over the exposed surface of said stack; said encapsulation comprising an interior, central and exterior layer of diverse materials; said internal layer being of a material characterized in having superior electrical properties; said central layer being of a material characterized in having superior mechanical properties; said exterior layer being of a material characterized in having superior chemical properties.

4. The device substantially as set forth in claim 1 wherein each of said modules contains an odd number of rectifier elements.

5. The device substantially as set forth in claim 1 which further includes respective capacitor lead connection means and respective resistor lead connection means spaced from and adjacent each of said fins and second connection means; and a respective resistor and capacitor for each of said rectifier elements extending between said first and second plates with their said respective rectifier and connected to said respective and registering resistor connection means and capacitor connection means of said fins.

6. A module of a plurality of series connected rectifier elements; said module comprising first and second generally parallel spaced plates; each of said first and second plates comprising a plurality of generally flat spaced and coplanar fin elements and a terminal fin element coplanar with and spaced from said generally flat fin elements; each of said plurality of flat fin elements including first and second connection means for mechanically and electrically receiving the anode and cathode terminal respectively of a first and second rectifier element of said plurality of rectifier elements; each of said terminal fin elements including connection means for mechanically and electrically receiving one of the cathode or anode terminals of one of said rectifier elements of said plurality of rectifier elements; each of said generally flat fin elements of said first and second plates being rotated out of registry with respect to one another with the first and second connection means of said plurality of fins of said first plate in registry with said second and first connection means respectively of said plurality of fins of said second plate; each of said connection means of said terminal fin elements of said first and second plates in registry with a first and second connection means respectively of one of said fins of said opposing first and second plates respectively; each of said rectifier elements electrically and mechanically connected between each of said registering first and second connection means of said fins of said first and second plates to define a progression of series connected rectifier elements.

References Cited by the Examiner
UNITED STATES PATENTS

| | | | |
|---|---|---|---|
| 2,459,018 | 1/1949 | De Monte et al. | 117—218 |
| 2,523,037 | 9/1950 | Mathes | 117—218 |
| 2,796,559 | 6/1957 | Feucht | 317—100 |
| 3,234,451 | 2/1966 | Diebold | 317—100 X |

ROBERT K. SCHAEFER, *Primary Examiner.*

M. GINSBURG, *Assistant Examiner.*